United States Patent [19]

Lamoria et al.

[11] 4,086,200

[45] Apr. 25, 1978

[54] VINYLIDENE CHLORIDE POLYMER LATEX BASED CEMENT ADDITIVES

[75] Inventors: Lz F. Lamoria; Robert D. Van Dell, both of Midland, Mich.

[73] Assignee: The Dow Chemical Company, Midland, Mich.

[21] Appl. No.: 815,967

[22] Filed: Jul. 15, 1977

[51] Int. Cl.² .............................................. C08K 3/00
[52] U.S. Cl. ...................... 260/29.6 S; 260/29.15 B; 260/29.6 ME; 260/29.6 SQ; 260/42.13
[58] Field of Search .................. 260/29.6 S, 29.6 SQ, 260/29.15 B, 29.6 ME, 42.13

[56] References Cited

U.S. PATENT DOCUMENTS

| Re. 28,722 | 2/1976 | Sanders | 260/29.7 S |
|---|---|---|---|
| 2,817,128 | 12/1957 | Wickett | 260/42.13 |
| 3,043,790 | 7/1962 | Sanders | 260/29.7 S |
| 3,250,736 | 5/1966 | Gibbs et al. | 260/29.6 S |
| 3,917,574 | 11/1975 | Gibbs et al. | 260/79.3 MU |
| 3,936,408 | 2/1976 | Adams et al. | 260/29.6 S |
| 3,965,032 | 6/1976 | Gibbs et al. | 260/79.3 MU |
| 4,015,991 | 4/1977 | Persinski et al. | 260/29.6 S |

FOREIGN PATENT DOCUMENTS

| 967,587 | 8/1964 | United Kingdom | 260/29.7 S |
|---|---|---|---|

*Primary Examiner*—Eugene C. Rzucidlo
*Attorney, Agent, or Firm*—Ronald G. Brookens

[57] ABSTRACT

This invention is directed to cement additives comprising (1) a vinylidene chloride polymer latex, (2) a nonionic surfactant, (3) a polyelectrolyte comprising the product obtained by copolymerizing methylmethacrylate and a sulfoester of α-methylene carboxylic acid or its salt, and (4) a polyorganosiloxane foam depressant; and to portland cement compositions containing such additives.

12 Claims, No Drawings

VINYLIDENE CHLORIDE POLYMER LATEX BASED CEMENT ADDITIVES

BACKGROUND OF THE INVENTION

Portland cement is one of the most widely used materials in the construction industry. Although unmodified concrete and cement mortar systems (i.e., those not containing a polymer latex modifier) have adequate properties for many construction applications, there remain many areas in which such properties, particularly strength properties, are not acceptable.

Latex-modified portland cement systems have been developed that radically change the physical properties of unmodified concrete and cement mortar. Of such latex-modified cement systems, the addition of vinylidene chloride polymer latexes to portland cement have provided compositions having exceptionally high strength. British Pat. No. 967,587 is directed to such latex-modified portland cement systems and serves to illustrate the unique characteristics of such compositions as contrasted with other latex-modified cement systems.

Prior known vinylidene chloride polymer latexes have often been found, however, to be colloidally unstable in portland cement compositions (primarily due to high pH and high calcium ion concentrations in such cement compositions) and thus were characterized by a substantial bleeding of the latex modifier from the cement with resultant losses in desired properties of the cement systems.

U.S. Pat. No. 3,250,736 discloses a means for greatly reducing bleeding of vinylidene chloride polymer latex from cement compositions by addition, during the manufacture of the latex, of a comonomeric surfactant, e.g., 2-sulfoethyl methacrylate. Utilization of surfactants of this type is successful in providing latex-modified cement compositions having excellent resistance to bleeding and which, after placement and curing, produce good dry bond strengths, compressive strengths, tensile strengths, flexural stengths, and chemical and solvent resistance.

Such latex-based cement additives, however, have been found to be deficient with regard to obtaining optimum mechanical and shear stability, freeze/thaw stability and workability, i.e., the rheological characteristic generally known as a "bingham" body. Further, prior known modified cement compositions fail to provide desired adhesion to cementitious substrates, e.g., to concrete surfaces such as pavements and bridge decks, cement blocks, bricks and the like to which they are conventionally applied.

SUMMARY OF THE INVENTION

Latex-based cement additives having the combination of desirable properties as set forth above consist essentially of (1) a vinylidene chloride polymer latex, containing up to about 60 percent by weight of polymer solids, and, based on 100 parts of said latex polymer solids, (2) from about 3 to about 10 parts by weight of a nonionic surfactant, (3) from about 2.5 to about 10 parts by weight of a polyelectrolyte having a number average molecular weight of less than about 3000 and preferably from about 1000 to about 2000, said polyelectrolyte consisting essentially of about 3 parts by weight of methyl methacrylate and about 1 part by weight of a sulfoester of α-methylene carboxylic acid or its salt having the formula $$R-CO_2-Q-SO_3M$$

wherein the radical R is selected from the group consisting of vinyl and α-substituted vinyl, and the radical —Q— is a divalent hydrocarbon radical having its valence bond on different carbon atoms, and M is a cation, and (4) from about 0.1 to about 5 parts by weight of a polyorganosiloxane foam depressant. The invention further encompasses portland cement compositions comprising a mixture of portland cement and the above-described cement additives wherein said vinylidene chloride polymer latex is present in an amount sufficient to provide from about 5 to about 20 parts by weight of latex polymer solids based on the weight of cement.

DESCRIPTION OF THE PREFERRED EMBODIMENTS

The term "portland cement" is used herein to include generally the kind of product obtained by heating lime-clay mixtures, or natural cement rock, to such a temperature that practically the entire product is sintered, followed by grinding. The product is often a mixture of dicalcium and tricalcium silicate with lesser amounts of aluminate. Various additives can be included in accordance with conventional portland cement manufacturing practices. It will be understood that various modifications such as the hydraulic cements of the kind commonly known as calcium-aluminate cements can be used as substantial equivalents for the purposes of this invention.

In many instances, it may be desirable to combine the cement compositions of this invention with an aggregate material. In this regard, the preferred aggregate material is sand, however, any particulate material may be used including stone, gravel, pebbles, granite, carborundum, marble chips, mica and the like.

By the term "vinylidene chloride polymer latex" as used herein is meant any aqueous colloidal dispersion of an organic interpolymer which interpolymer is composed of from about 35 to about 90 parts by weight of vinylidene chloride and from about 65 to 10 parts by weight of at least one other interpolymerized material of the general formula:

$$CH_2=\underset{R}{\underset{|}{C}}-X$$

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to 18 carbon atoms inclusively.

Exemplary of such interpolymerizable monomeric materials are: methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octadecenyl acrylate, methyl methacrylate, ethyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylates, vinyl halides (e.g., vinyl chloride, vinyl bromide, etc.), acrylonitrile, methacrylonitrile, and the like.

Representative types of water-insoluble vinylidene chloride polymers which have been discovered to be highly satisfactory as the latex components employed in the superior latex-modified portland cement compositions of the present invention include those interpolymers designated in the following Table I:

TABLE I

| Vinylidene Chloride Interpolymer Compositions |||||||||||||
|---|---|---|---|---|---|---|---|---|---|---|---|---|
| Organic Monomer Components | Parts by Weight |||||||||||||
| Vinylidene Chloride | 40 | 60 | 89 | 90 | 50 | 88 | 50 | 52 | 70 | 75 | 75 | 75 |
| Vinyl Chloride |  |  |  |  |  |  | 40 | 35 | 20 | 20 | 20 | 20 |
| Ethyl Acrylate | 60 | 40 |  |  | 40 | 7 | 10 |  | 10 | 5 |  | 5 |
| Methyl Methacrylate |  |  | 10 | 10 |  |  |  |  |  |  |  | 2 |
| 2-Ethylhexyl Acrylate |  |  |  |  |  |  |  | 13 |  |  |  |  |
| Acrylonitrile |  |  | 11 |  | 5 |  |  |  |  | 5 |  |  |

Of particular benefit in the preparation of the exceptionally strong, latex-modified portland cement compositions of the present invention is the interpolymer latex containing about 75 parts by weight of interpolymerized vinylidene chloride, about 20 parts by weight of interpolymerized vinyl chloride, about 5 parts by weight of interpolymerized ethyl acrylate, and about 2 parts by weight of interpolymerized methyl methacrylate.

Illustrative of non-ionic surfactants are, for example: fatty acid esters such as glycerol monostearate, diethyleneglycol laurate, propyleneglycol monostearate, sorbitol monolaurate, and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols, and alkyl phenols. Preferred are the polyoxyalkylene derivatives of propylene glycol having a molecular weight of at least about 1,000 to about 15,000; and the condensation products of ethylene oxide with alkyl phenols, particularly the di-butyl-phenoxynona-oxyethyleneethanols. The above monomeric surfactants are advantageously used in concentrations of from about 3 to about 10 and preferably about 6 parts by weight based on 100 parts of latex polymer solids. Utilization of concentrations less than about 3 parts by weight result in latex-modified cement compositions having inadequate adhesion to cementitious material to which they are conventionally applied, whereas utilization of such surfactants in concentrations exceeding about 10 parts by weight are unnecessary and may adversely affect the flow properties of the latex-modified cement compositions.

Polyelectrolytes of the type required for use by the present invention are broadly disclosed in U.S. Pat. Nos. 3,917,574 and 3,965,032. The polyelectrolytes found to be particularly useful for the purposes of the present invention are those polyelectrolytes having a number average molecular weight up to about 3,000 and preferably in the range of about 1,000 to about 2,000, which are prepared by copolymerization of from about 3 parts by weight of monomeric methyl methacrylate with about 1 part by weight of a monomeric sulfoester of α-methylene carboxylic acid, or its salt, having the formula $$R-CO_2-Q-SO_3M$$

wherein the radical R is selected from the group consisting of vinyl and α-substituted vinyl, and the radical —Q— is a divalent hydrocarbon radical having its valence bonds on different carbon atoms, and M is a cation. A particularly preferred monomeric sulfoester is 2-sulfoethyl methacrylate or the sodium salt thereof. The comparative data set forth in Table 2, infra, illustrate the criticality of the composition of the prescribed polyelectrolytes for obtaining the advantageous results of the present invention.

The above prescribed polyelectrolytes are used in concentrations of from about 2.5 to about 10 parts by weight, based on 100 parts of latex polymer solids, and preferably from about 2.5 to about 4 parts by weight, particularly when preparing latex-modified cement mortar compositions requiring optimum workability properties. Such polyelectrolytes are generally incorporated in the latex (or the cement compositions) while in the form of aqueous dispersions containing from about 25 to 50 parts by weight of polyelectrolyte solids. The polyelectrolyte, or a portion thereof, may also be added during the polymerization reaction forming the polymer latex.

Illustrative of the polyorganosiloxanes are the condensation products resulting from polymerization of organo diols, as represented by the formula

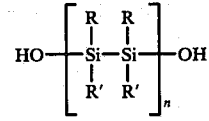

where R and R', in the above formula, represent organic radicals such as alkyl, aryl, aralkyl and alkaryl or heterocyclic groups, and $n$ is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

The use of such polyorganosiloxanes as foam depressants for polymeric latex used to modify cement compositions is set forth in U.S. Pat. No. 3,043,790.

Cement mixes are made according to the present invention by simply adding the cement additive prescribed herein to the cement with mixing and such added water as is necessary to obtain a cement mix of desired flow and working consistency. If the cement additive of the invention and portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10 percent by weight of the mineral aggregate and usually from about 15 to 30 percent of the weight of the mineral aggregate.

The following example, wherein all parts and percentages are by weight, serves to illustrate the present invention.

EXAMPLE

Part A — Cement Additive Preparation

The following general formulation was used to prepare a series of individual cement additives: Interpolymer latex containing 46.25% solids having a composition of:
- 75 pts. by wt. vinylidene chloride/
- 20 pts. by wt. vinyl chloride/
- 5 pts. by wt. ethyl acrylate/
- 2 pts. by wt. methylmethacrylate plus
- nonionic surfactant (0 to 10 pts. per 100 pts. of latex solids of a di-t-butylphenoxynonaoxyethyleneethanol)

plus
- polyorganosiloxane foam depressant (0.4 pt. per 100 pts. of latex solids of a condensation product of dimethyl silane diol)

plus
- polyelectrolyte (0 to 6 pts. by wt. per 100 pts. of latex solids of designated polyelectrolyte).

Part B — Polyelectrolyte Preparation

A polyelectrolyte having a number average molecular weight of about 1575 and consisting essentially of about 3 parts by weight methylmethacrylate (MMA) and 1 part by weight 2-sulfoethyl methacrylate (SEM) was prepared by a homogeneous, continuous monomer addition, solution polymerization technique, substantially as set forth in Example 3 of U.S. Pat. No. 3,965,032, utilizing a molar ratio of methymethacrylate to sulfoester of about 6 to 1 (weight ratio of 3/1).

Part C — Effect of Polyelectrolyte on Cement Additive Properties

In each of a series of experiments individual cement additives, of the composition as set forth in Part A supra, were tested as follows:

Freeze/thaw stability — The cement additive was subjected to a temperature of −20° F for a period of 24 hours, then slowly brought to normal ambient room temperature, e.g. 77° F. Freeze/thaw stability was achieved if the cement additive redispersed upon warming. Lack of freeze/thaw stability was indicated if the cement additive remained a solid, non-redispersed or non-redispersible mass upon warming.

Table 1

Freeze/Thaw Stability (All Cement Additives Contain MMA/SEM (6/1 Molar Ratio Polyelectrolyte) Plus 3 Parts/ 100 Parts Of Latex Solids Of Designated Nonionic Surfactant and 0.4 Pt./100 Pts. Of Latex Solids Of Polyorganosiloxane Foam Depressant)

| Polyelectrolyte Conc. (pts./100 pts. of latex polymer solids) | Freeze/Thaw Stability |
|---|---|
| For Comparison | |
| 0.5 | No |
| 1 | No |
| 2 | No |
| The Invention | |
| 2.5 | Yes (1 cycle) |
| 4 | Yes (1 cycle) |
| 6 | Yes (17 cycles) |

An additional comparison indicated that a polyelectrolyte prepared by copolymerizing hydroxy ethylacrylate (HEA) and (SEM) by the process as disclosed supra using a molar ratio of 6 moles of HEA and 1 mole SEM, failed to provide freeze/thaw stability over the initial temperature cycle.

Shelf-Life Stability — The cement additive was permitted to stand under normal ambient room temperature (e.g., 77° C) for extended periods of time. Loss of shelf-life is indicated by settling of the solid ingredients.

Table 2

Shelf-Life Stability Of Cement Additives Containing Varying Types Of Polyelectrolytes, (All Cement Additives Contain 3 Pts./100 Pts. Of Latex Solids Of The Nonionic Surfactant Designated Supra, And 0.4 Pt./100 Pts. Of Latex Solids Of Polyorganosiloxane Foam Depressant).

| Polyelectrolyte Type | Amt. (pts./100 pts of latex solids) | Shelf-life |
|---|---|---|
| For Comparison | | |
| MMA/SEM (7/1 molar ratio) | 2.5–10 | <12 months |
| MMA/SEM (5/1 molar ratio) | 2.5–10 | <12 months |
| The Invention | | |
| MMA/SEM (6/1 molar ratio) | 2.5–10 | >24 months |

By way of additional comparison, a cement additive as described herein but without polyelectrolyte, nonionic surfactant, or antifoamer was characterized by a shelf-life of about 7 months.

Calcium ion stability — One part by weight of cement additive was admixed with approximately two parts by weight of portland cement. Calcium ion stability is indicated by the ability to easily stir such admixture; whereas calcium ion instability is evidenced by formation of a thick, substantially non-stirrable mass. Cement additives containing from 3 to 10 parts per 100 parts of latex solids of a MMA/SEM (6/1 molar ratio) polyelectrolyte (along with 3 pts./100 parts of latex solids of the designated nonionic surfactant and 0.04 pt./100 parts of latex solids of polyorganosiloxane foam depressant), evidenced calcium instability.

Table 3
Shear Stability Of Cement Additives Containing Varying Amounts Of Polyelectrolytes (All Cement Additives Contain 3 Pts./100 Pts. Of Latex Solids Of The Nonionic Surfactant Designated Supra And 0.4 Pt./100 Pts. Of Polyorganosiloxane Foam Depressant).

| Polyelectrolyte Type | Amt. (pts./100 pts. latex solids) | Shear Stability (Hamilton Beach Stability at 15,000 RPM's) |
|---|---|---|
| For Comparison | | |
| MMA/SEM (6/1 molar ratio) | none | 20 Minutes |
| The Invention | | |
| MMA/SEM (6/1 molar ratio) | 3 | >2 Hours |

Workability — This test is a measure of the characteristic of high yield values of cement compositions with low viscosity under shear and is particularly important for cement mortar compositions. Workability values for the following cement compositions, containing the designated cement additives, were obtained using the method of Isenburg, *Materials Research and Standards*, July 1965, pp. 358–361, utilizing a Brabender Viscocorder operating at 25 rpm and using a 125 g-cm Torque Spring.

| Material | Grams |
|---|---|
| Portland Type I Cement | 282 |
| Workability agent (Piqua Marble Flour) | 150 |
| Cement Additive | 123 |
| Additional Water | 50 |

Table 4
Workability Of Cement Additives Containing Varying Types Of Polyelectrolytes. (All Cement Additives Contain 3 Pts./100 Pts. Of Latex Solids Of The Nonionic Surfacant Designated Supra, 0.4 Pt./100 Pts. Of Latex Solids Of Polyorganosiloxane Foam Depressant And 6 Pts./100 Pts. Of Latex Solids Of The Designated Polyelectrolyte).

| Polyelectrolyte Type | No. Ave. Mol. Wt. | Workability |
|---|---|---|
| For Comparison | | |
| MMA/SEM (6/1 molar ratio) | 3400 | Poor |
| MMA/SEM (4.34/1 molar ratio) | 1167 | Poor |
| The Invention | | |
| MMA/SEM (6/1 molar ratio) | 1575 | Excellent |

The above data illustrate the criticality of the polyelectrolyte composition prescribed for use in the present invention.

Strength properties — The following formulations were utilized for determination of compressive strength (ASTM Test No. C-190 using six inch cylinders); tensile strength (ASTM Test No. C-190 using dog-bone shaped samples); and cross-brick adhesion (ASTM Test No. C-321).

| Material | Grams |
|---|---|
| Portland type I Cement | 282 |
| Piqua Marble Flour | 150 |
| Crystal Ottawa Sand | 846 |
| Cement Additive[(1)] | 123 |
| Additional Water | 50 |

[(1)] 6 pts./100 pts. of polyelectrolyte MMA/SEM (6/1 molar ratio, 1154 no. ave. mol. wt.), 3 pts./100 pts. latex solids of nonionic surfactant and 0.4 pt./100 pts. of latex solids of polyorganosiloxane foam depressant.

Table 5
Compressive Strengths Of Cement Compositions Containing Cement Additives.

| | For Comparison | The Invention |
|---|---|---|
| Compressive Strength, psi (Cured 28 days at 50% relative humidity and 23° F) | (Without polyelectrolyte, nonionic surfactant or foam depressant) 7169 | 7655 |

Table 6
Cross-Brick Adhesion Values For Cement Compositions Containing Cement Additives

| Cement Additive | PSI |
|---|---|
| For Comparison | |
| (cement additive of the invention absent nonionic surfactant) | 19 (bond failure) |
| The Invention | |
| (cement additive of the invention) | 127 (mortar failure) |

The above data illustrate the criticality of the presence of the nonionic surfactant component of the cement additive for achieving cement compositions having enhanced adhesion properties.

While it is generally convenient to prepare the cement additive by precombining the vinylidene chloride polymer latex, nonionic surfactant, polyelectrolyte and polyorganosiloxane antifoamer and then introducing the resulting mixture into the cement, cement-sand, or cement-sand-coarse aggregate mixture, it will be understood that it is not necessary that all the various components of the additive be so premixed. For example, substantially equivalent cement, mortar, or concrete mixes are obtained by separate addition of the requisite quantities of the polymer latex (containing sufficient surfactant to avoid coagulation thereof), the polyelectrolyte and/or the polyorganosiloxane foam depressant. Further, as indicated supra, the polyelectrolyte can be introduced during the polymerization reaction forming the vinylidene chloride polymer latex.

What is claimed is:

1. A cement additive consisting essentially of (1) a vinylidene chloride polymer latex containing up to about 60 parts by weight of polymer solids, said vinylidene chloride polymer latex consists essentially of from about 35 to about 90 percent by weight of vinylidene chloride and from about 65 to about 10 percent by weight of at least one other interpolymerized material of the general formula:

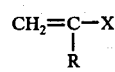

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to b 18 carbon atoms; and, based on 100 parts of said latex polymer solids (2) from about 3 to about 10 parts by weight of a nonionic surfactnat; (3) from about 2.5 to about 10 parts by weight of a polyelectrolyte having a number average molecular weight of less than about 3000 and consisting essentially of 3 parts by weight of methyl mathacrylate and about 1 part by weight of a sulfo-ester of α-methylene carboxylic acid or its salt having the formula $$R-CO_2-Q-SO_3M$$

wherein the radical R is selected from the group consisting of vinyl and α-substituted vinyl, and the radical —Q— is a divalent hydrocarbon radical having its valence bonds on a different carbon atom, and M is a cation, and (4) from about 0.1 to about 5 parts by weight of a polyorganosiloxane foam depressant.

2. The cement additive of claim 1 wherein the vinylidene chloride polymer is an interpolymer of about 75 parts by weight vinylidene chloride, about 20 parts by weight vinyl chloride, about 5 parts by weight ethyl acrylate and about 2 parts by weight methyl methacrylate.

3. The cement additive of claim 2 wherein said nonionic surfactant is a di-butyl-phenoxynonaoxyethylene-ethanol.

4. The cement additive of claim 3 wherein said nonionic surfactant is di-t-butyl-phenoxynonaoxyethylene-ethanol.

5. The cement additive of claim 4 wherein said monomeric sulfoester of α-methylene carboxylic acid or its salt is 2-sulfoethyl methacrylate or the sodium salt thereof.

6. The cement additive of claim 5 wherein said polyorganosiloxane foam depressant is a condensation product of dimethyl silane diol.

7. A portland cement composition comprising a mixture of portland cement and a cement additive consisting essentially of (1) a vinylidene chloride polymer latex containing up to about 60 parts of polymer solids, said latex being present in an amount sufficient to provide from about 5 to about 20 parts by weight of latex polymer solids based on the weight of cement, wherein said vinylidene chloride polymer latex consists essentially of from about 35 to about 90 percent by weight of vinylidene chloride and from about 65 to about 10 percent by weight of at least one other interpolymerized material of the general formula:

$$CH_2=C-X \atop R$$

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to 18 carbon atoms; and, based on 100 parts of said latex polymer solids (2) from about 3 to about 10 parts by weight of a nonionic surfactant; (3) from about 2.5 to about 10 parts by weight of a polyelectrolyte having a number average molecular weight of less than about 3000 and consisting essentially of 3 parts by weight of methyl methacrylate and about 1 part by weight of a sulfo-ester of α-methylene carboxylic acid or its salt having the formula $$R-CO_2-Q-SO_3M$$

wherein the radical R is selected from the group consisting of vinyl and α-substituted vinyl, and the radical —Q— is a divalent hydrocarbon radical having its valence bonds on a different carbon atom, and M is a cation; and (4) from about 0.1 to about 5 parts by weight of a polyorganosiloxane foam depressant.

8. The portland cement composition of claim 7 wherein the vinylidene chloride polymer is an interpolymer of about 75 parts by weight vinylidene chloride, about 20 parts by weight vinyl chloride, about 5 parts by weight ethyl acrylate and about 2 parts by weight methyl methacrylate.

9. The portland cement composition of claim 8 wherein said nonionic surfactant is a di-butyl-phenoxynonaoxyethylene-ethanol.

10. The portland cement composition of claim 9 wherein said nonionic surfactant is di-t-butylphenoxynonaoxyethylene-ethanol.

11. The portland cement composition of claim 10 wherein said monomeric sulfoester of α-methylene carboxylic acid or its salt is 2-sulfoethyl methacrylate or the sodium salt thereof.

12. The portland cement composition of claim 11 wherein said polyorganosiloxane foam depressant is a condensation product of dimethyl silane diol.

* * * * *